United States Patent
Saitou et al.

(10) Patent No.: US 8,224,228 B2
(45) Date of Patent: Jul. 17, 2012

(54) COVER CLOSER

(75) Inventors: Kazuo Saitou, Higashiosaka (JP);
Yoshio Sunaga, Higashiosaka (JP)

(73) Assignee: Simotec Inc., Osaka-Hu (JP)

( * ) Notice: Subject to any disclaimer, the term of this patent is extended or adjusted under 35 U.S.C. 154(b) by 852 days.

(21) Appl. No.: 12/254,622

(22) Filed: Oct. 20, 2008

(65) Prior Publication Data

US 2010/0097745 A1 Apr. 22, 2010

(51) Int. Cl.
*H05K 5/03* (2006.01)
(52) U.S. Cl. ............ 399/380; 399/110; 399/81; 399/125
(58) Field of Classification Search .................... 49/333, 49/334; 399/380, 81, 107, 110, 125
See application file for complete search history.

(56) References Cited

U.S. PATENT DOCUMENTS

| | | | | |
|---|---|---|---|---|
| 3,422,704 A * | 1/1969 | Catlett | | 475/4 |
| 5,106,354 A * | 4/1992 | Russ et al. | | 475/342 |
| 5,398,448 A * | 3/1995 | Kallfass | | 49/334 |
| 6,055,779 A * | 5/2000 | Yang | | 49/386 |
| 6,481,160 B1 * | 11/2002 | Kowalczyk | | 49/335 |
| 7,012,675 B1 * | 3/2006 | Zhang et al. | | 355/75 |
| 2002/0089223 A1* | 7/2002 | Yu | | 297/362.11 |
| 2004/0107537 A1* | 6/2004 | Ahn et al. | | 16/221 |
| 2006/0099007 A1* | 5/2006 | Uchida | | 399/107 |
| 2006/0158702 A1* | 7/2006 | Kondo | | 358/498 |
| 2006/0180972 A1* | 8/2006 | Suzuki | | 271/3.14 |
| 2007/0067955 A1* | 3/2007 | Jing | | 16/286 |
| 2007/0297818 A1* | 12/2007 | Yamada et al. | | 399/38 |

* cited by examiner

*Primary Examiner* — Katherine W Mitchell
*Assistant Examiner* — Justin Rephann
(74) *Attorney, Agent, or Firm* — Browdy and Neimark, PLLC (57) ABSTRACT

A cover closer having a drive unit for electrically opening and closing a cover of a copying machine or the like is described. The cover closer can ease the burden of manipulation of the cover and minimize the constraints on designing the main body of the copying machine and the like. The cover closer is provided with a compact drive unit having a high reduction ratio by the use of planetary gears which reduce the input torque necessary for opening and closing the cover, so as to downsize an electric motor used in the drive unit. The drive unit can therefore be installed within the hinge structure of the cover closer.

10 Claims, 13 Drawing Sheets

COVER CLOSER

BACKGROUND OF THE INVENTION

1. Technical Field

The present invention relates to a cover closer for use in a copying machine, office automation equipment and the like apparatus having an opening mechanism.

2. Description of the Background Art

At the present time, most copying machines are provided with covers which must be manually opened and closed. Some copying machines are equipped with motor-operated covers. However, the driving mechanism is installed in the main body of the copying machine such that the design of the main body is subject to substantial constraints.

Also, in the case where the operator is a physically impaired person, it is a heavy burden to open and close the cover closer of a copying machine serving also as part of an automatic document feeder or any other heavy object, so that a solution is required.

SUMMARY OF THE INVENTION

Taking into consideration the above circumstances, it is an object of the present invention to provide a cover closer having a drive unit for electrically opening and closing a cover of a copying machine or the like capable of easing the burden on the operator of manipulating the cover and minimize the constraints on designing the main body of the copying machine and the like.

It is another object of the present invention to provide a cover closer having a drive unit for electrically opening and closing a cover of a copying machine or the like which can be designed in a compact size by incorporating the drive unit in the cover closer such that the constraints on designing the copying machine or the like is minimized.

In order to accomplish the object as described above, a cover closer comprises: a stationary member; and a pivotal member which is pivotally connected to the stationary member; and an electric drive unit composed of an electric motor and a reduction gear mechanism, wherein the electric drive unit is integrated with the cover closer.

In accordance with a preferred embodiment of the present invention, the electric drive unit is installed in the cover closer.

Also, in accordance with another preferred embodiment of the present invention, the reduction gear mechanism has a high reduction ratio by the use of planetary gears.

Furthermore, in accordance with another preferred embodiment of the present invention, the electric drive unit is provided with a clutch mechanism which makes it possible to manually open and close the cover closer.

Still further, in accordance with another preferred embodiment of the present invention, the electric drive unit is provided with a slip mechanism which makes it possible to prevent the electric drive unit from being damaged due to a overload.

Still further, in accordance with another preferred embodiment of the present invention, the speed of moving the cover closer is controlled to reduce the load applied when starting the motion and attenuate impact occurring when closing the cover closer for ensuring safety.

Still further, in accordance with another preferred embodiment of the present invention, the electric motor is controlled by a control signal which is generated by operating an open/close button, a dedicated sensor, an external remote control unit or any combination thereof provided for a copying machine or the like.

Still further, in accordance with another preferred embodiment of the present invention, when an overload is applied to the cover closer such that the motion of the cover closer is hindered while operating the electric motor, this overload is detected by a current meter, an elapse time counter or the like.

Still further, in accordance with another preferred embodiment of the present invention, the electric motor is provided with a speed control mechanism which makes it possible to adjust the speed of the operation of the cover closer at the user's desire.

Still further, in accordance with another preferred embodiment of the present invention, the electric drive unit is provided with the functionality (dumper capability) of attenuating impact occurring when closing and grounding the cover closer.

In accordance with another aspect of the present invention, a cover closer for electrically opening and closing a cover on a main body comprising: a stationary member to be fixed to the main body; a pivotal member which is pivotally connected to the stationary member and to be fixed to the cover; and an electric drive unit composed of an electric motor and a reduction gear mechanism, connected between the stationary member and the pivotal member, and operable to rotate the pivotal member for opening or closing the cover, wherein the electric drive unit is integrated with the cover closer.

In accordance with a preferred embodiment of the present invention, the main body is the main body of a copying machine.

As a result, in accordance with the present invention, by making use of planetary gears in multiple stages, it is possible to achieve downsizing and a high reduction ratio, and reduce the required input torque to make the electric motor compact such that it can be installed within the hinge structure of the cover closer in a compact fashion.

BRIEF DESCRIPTION OF THE DRAWINGS

The objects and features of the present invention will become more apparent from consideration of the following detailed description taken in conjunction with the accompanying drawings in which.

BEST MODE FOR CARRYING OUT THE INVENTION

Next, a cover closer in accordance with the present invention will be explained with reference to the accompanying drawings.

Figure 1:
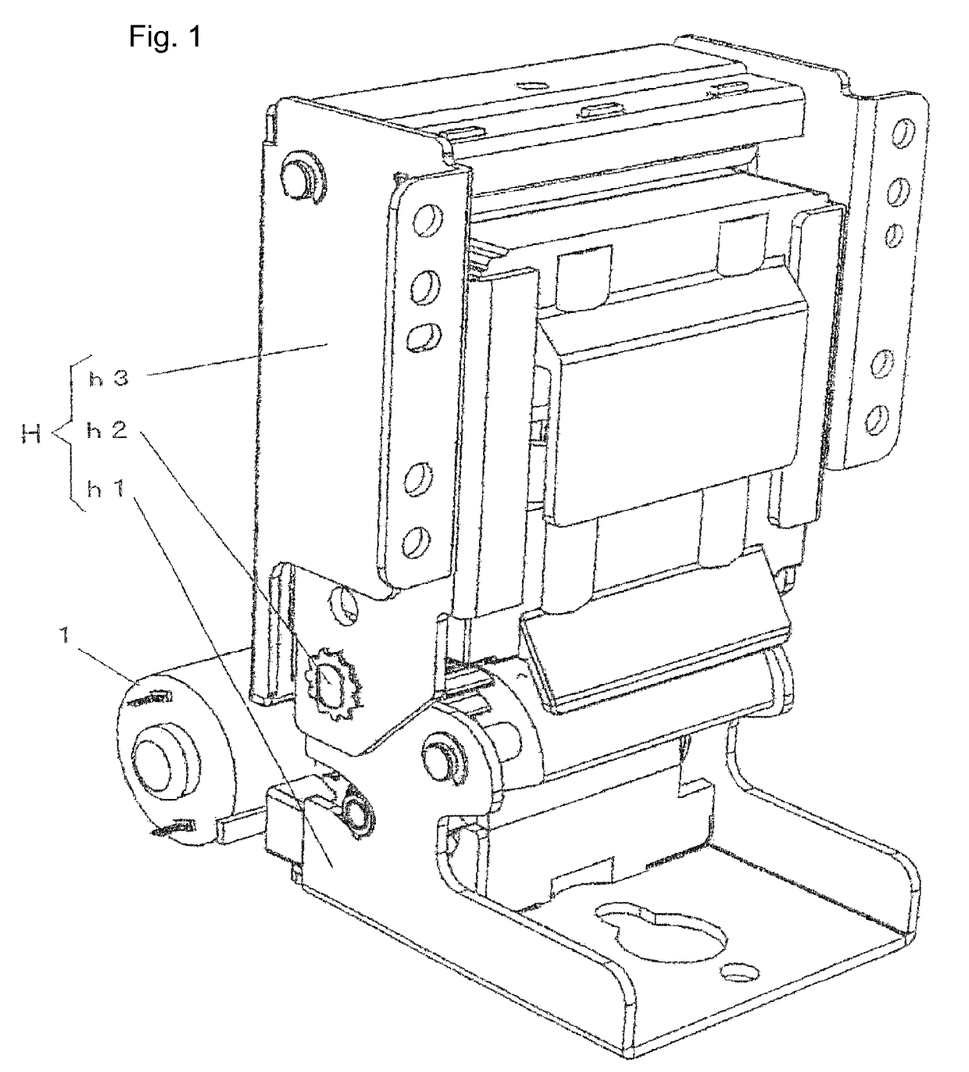
FIG. 1 is a perspective view for showing a cover closer having a drive unit in accordance with an embodiment of the present invention.
Figure 2:
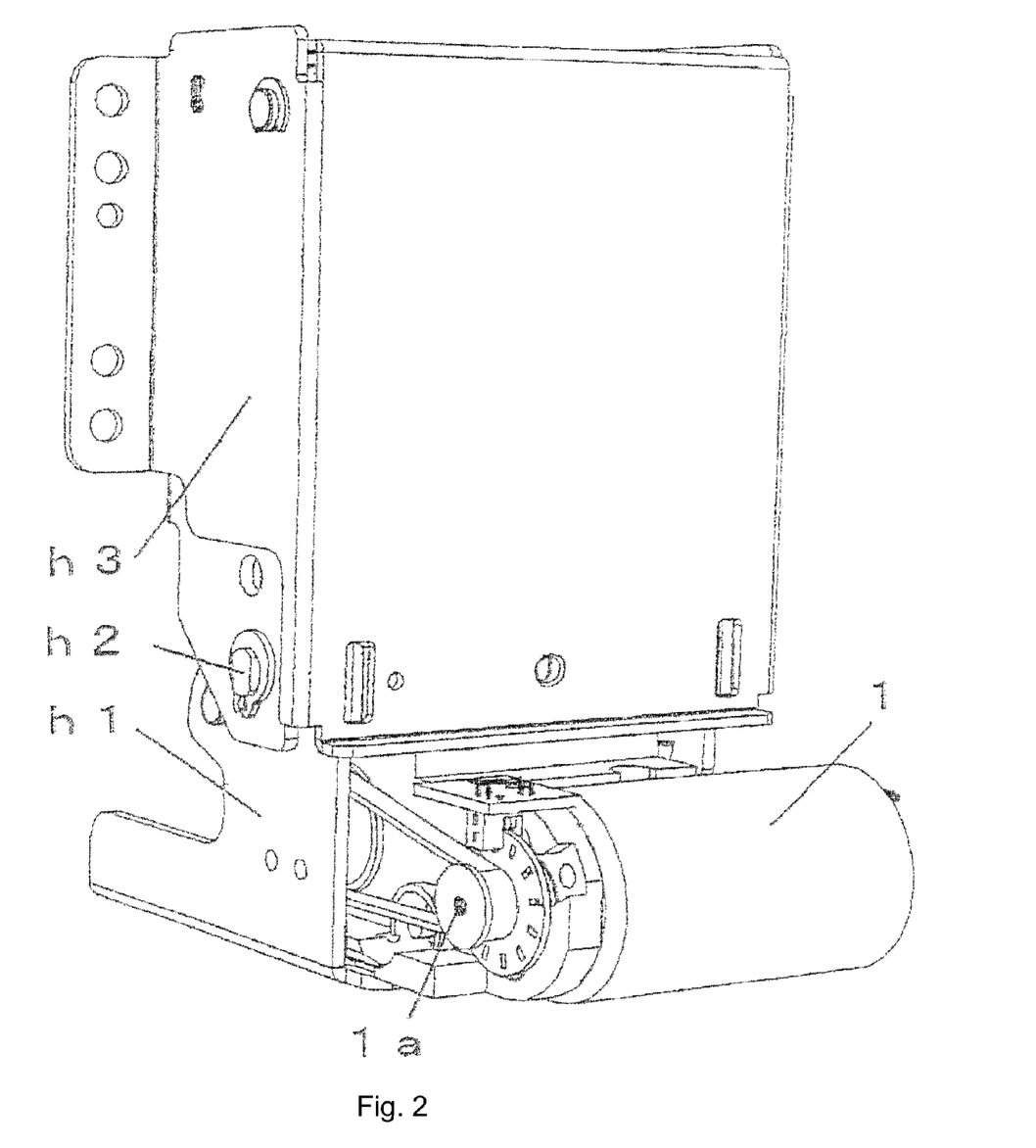
FIG. 2 is a perspective view for showing the cover closer as illustrated in FIG. 1 as seen from the opposite direction.
Figure 3:
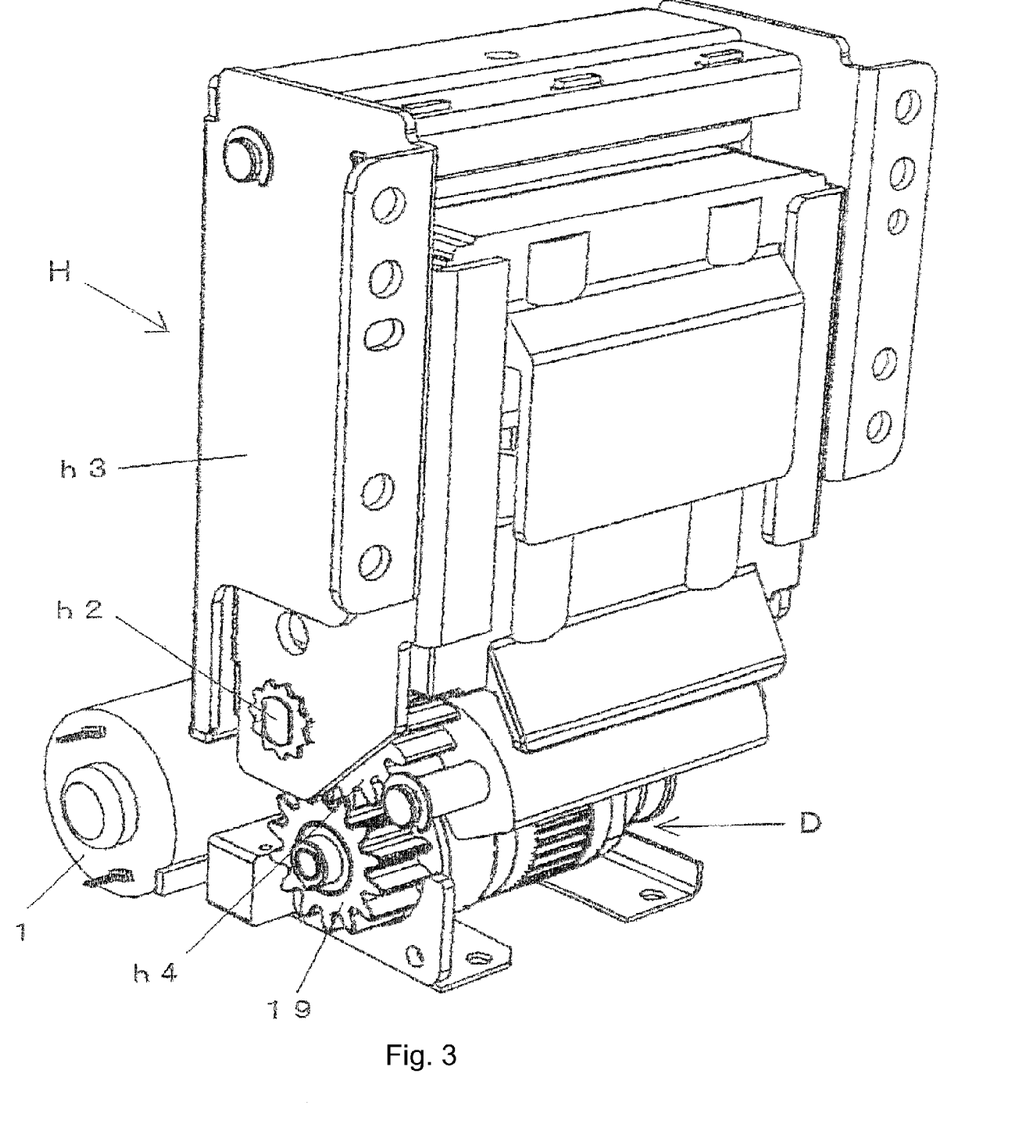
FIG. 3 is a perspective view for showing the main portion of the cover closer as illustrated in FIG. 1.

FIG. 1 through FIG. 3 show a cover closer in accordance with an embodiment of the present invention as a hinge mechanism for the original cover of a copying machine and so forth. In the figure, reference H denotes the joint structure of the cover closer, and reference D denotes a drive unit for driving the joint structure.

The joint structure H includes a stationary member h1, and a pivotal member h3 which is pivotally connect to the stationary member h1 through a hinge pin h2. The stationary member h1 is to be fixed to the main body of a copying machine or the like (not shown in the figure). The pivotal member h3 is to be fixed to the cover of the copying machine or the like.

Figure 4:
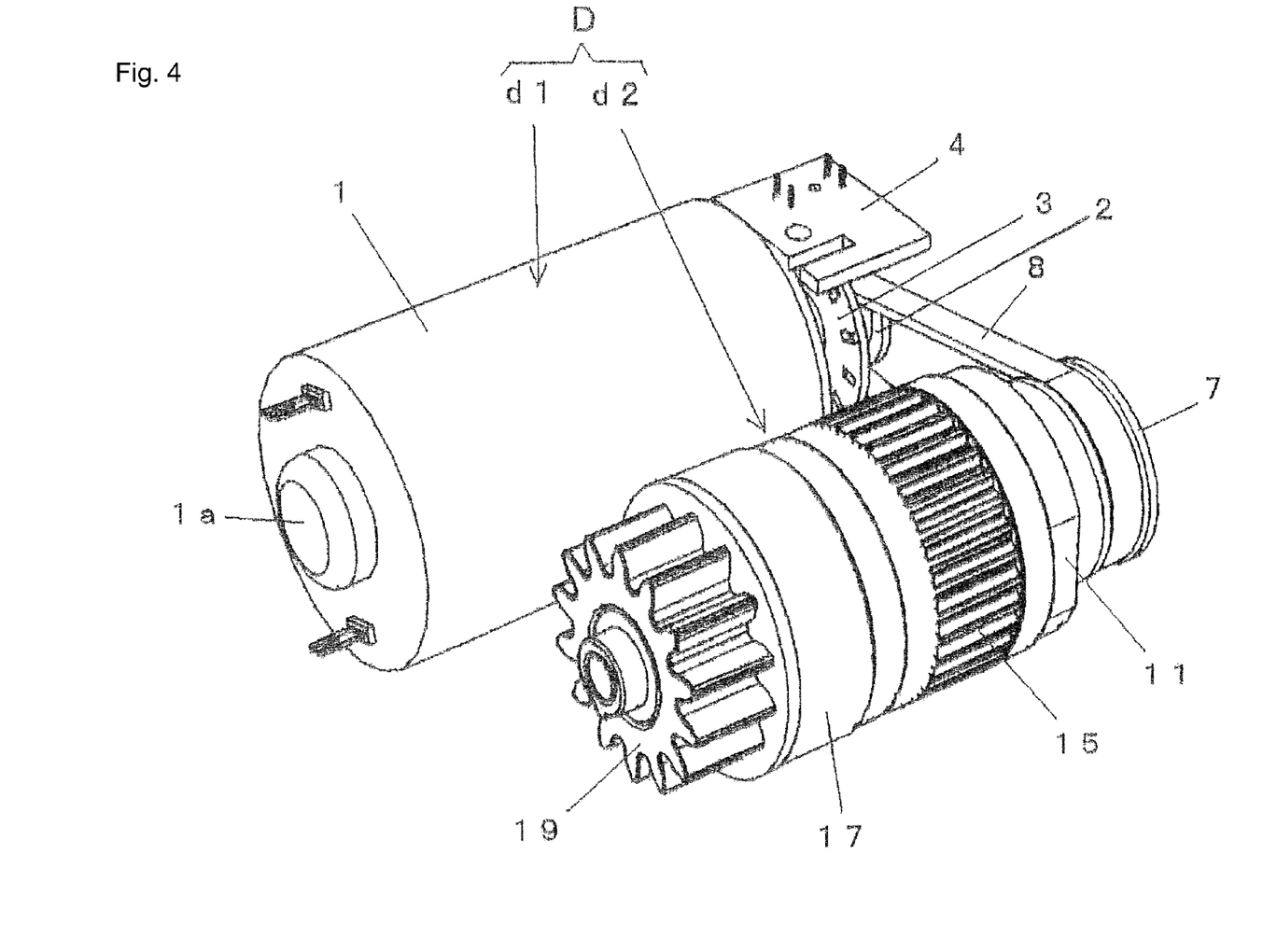
FIG. 4 is a perspective view for generally showing the drive unit which is composed mainly of an electric motor unit and a reduction gear mechanism.

FIG. 4 is a perspective view for generally showing the drive unit D which is composed mainly of an electric motor unit d1 and a reduction gear mechanism d2.

The electric motor unit d1 is composed mainly of an electric motor 1, an output pulley 2 and a rotation plate 3 which are attached to the output shaft 1a of the electric motor 1 for detecting the number of rotations (rotational speed), and an optical sensor 4 for optically reading the rotational speed of the rotation plate 3. Needless to say, any other known rotational speed detecting mechanism can be employed in order to detect the rotational speed of the electric motor 1 in place of the combination of the rotation plate 3 and the optical sensor 4.

Figure 5:
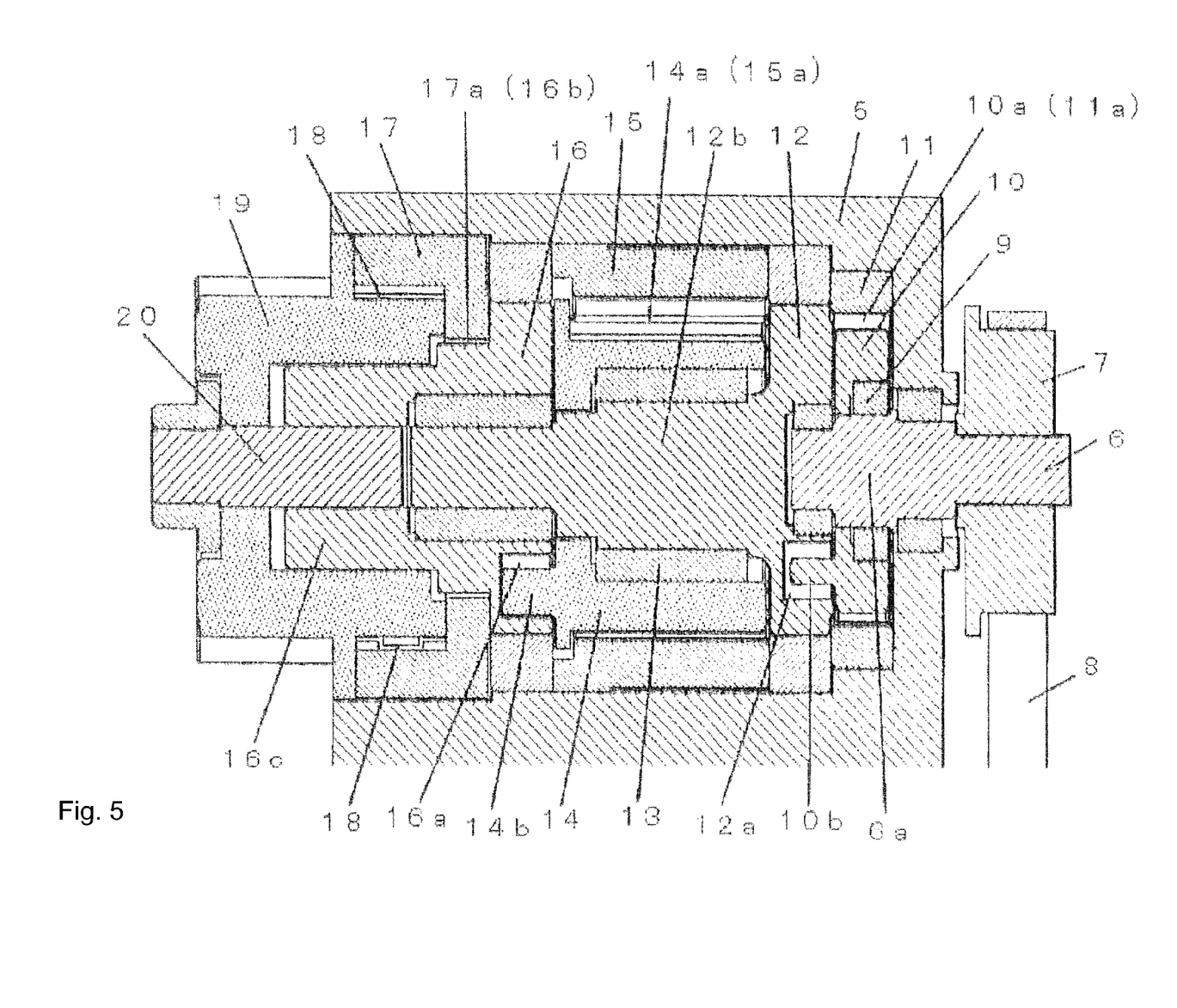
FIG. 5 is a cross sectional view for showing the reduction gear mechanism as illustrated in FIG. 4.
Figure 6A:
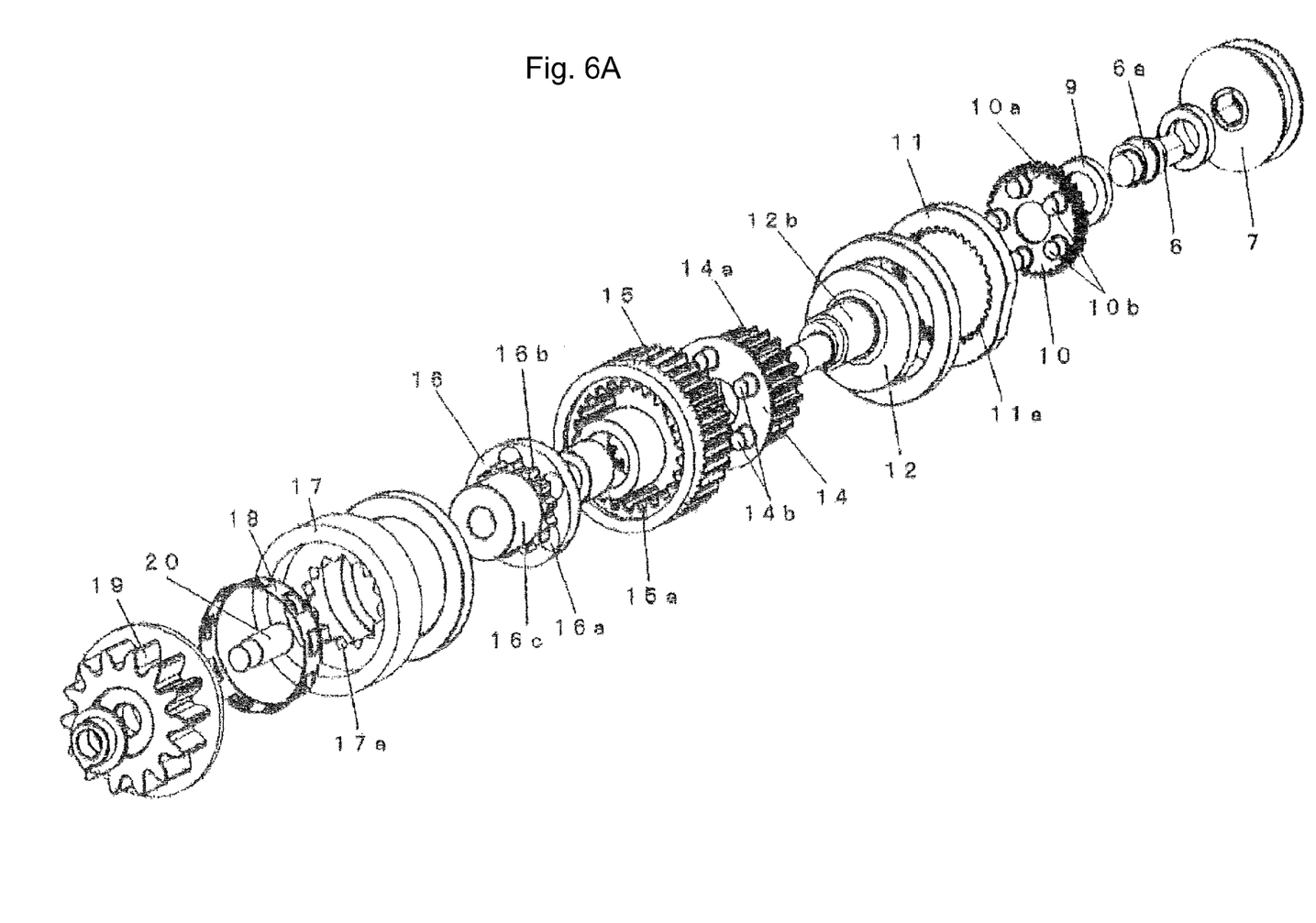
FIG. 6A is an exploded perspective view for showing the reduction gear mechanism as illustrated in FIG. 5.
Figure 6B:
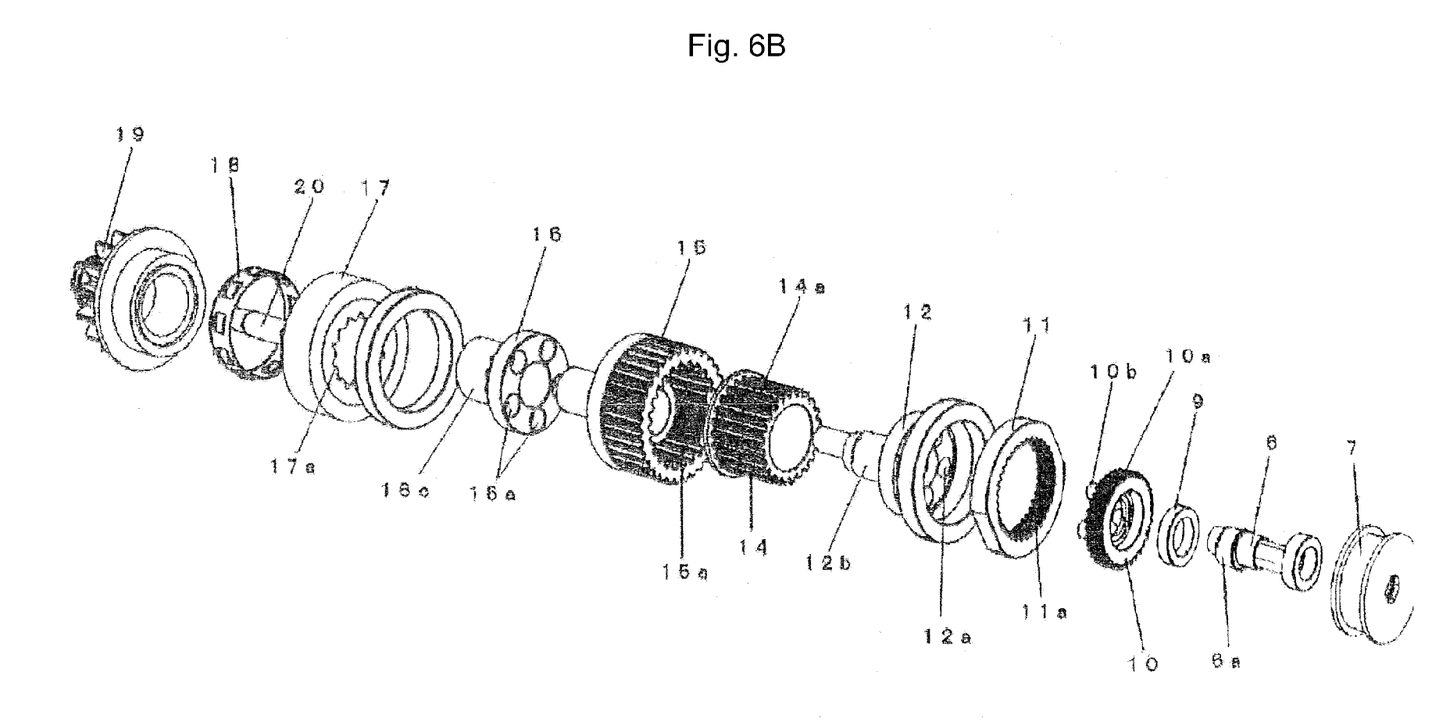
FIG. 6B is an exploded perspective view for showing the reduction gear mechanism as seem from a different direction than in FIG. 6A.

As apparent from FIG. 5 and FIGS. 6A and 6B, the reduction gear mechanism d2 is composed of a number of constituent elements as explained below.

An input shaft 6 is rotatably attached to a main case 5. The input pulley 7 is attached to the input shaft 6. As shown in FIG. 4, a motion transmission belt 8 is provided between the input pulley 7 and the output pulley 2 to run around them.

Also, an eccentric shaft 6a is integrally formed with or attached to the input shaft 6. A first planetary gear 10 is rotatably fitted around outside of the eccentric shaft 6a through a bearing 9. The first planetary gear 10 is provided with external teeth 10a which are engaged with internal tooth 11a of a fixed gear 11 such that the first planetary gear 10 rotates on its axis while rolling inside the fixed gear 11.

A number of pins 10b are planted into one surface of the first planetary gear 10 in the axial direction, and fitted into holes 12a of a follower flange 12. Meanwhile, the end of the eccentric shaft 6a is rotatably supported by the follower flange 12.

Also, an eccentric shaft 12b is integrally formed with or attached to the follower flange 12. A second planetary gear 14 is rotatably fitted around outside of the eccentric shaft 12b through a needle bearing 13. The second planetary gear 14 is provided with external teeth 14a which are engaged with internal tooth 15a of a sleeve gear 15 such that the second planetary gear 14 rotates on its axis while rolling inside the sleeve gear 15.

A number of pins 14b are planted into one surface of the second planetary gear 14 in the axial direction, and fitted into holes 16a of a follower flange 16. Meanwhile, the end of the eccentric shaft 12b is rotatably supported by the follower flange 16. The follower flange 16 is provided with external teeth 16b which are engaged with internal tooth 17a of a rotating holder 17.

A slip ring 18 is interposed between the inner surface of the sleeve portion of the rotating holder 17 and the outer surface of the sleeve portion of an output gear 19 such that they are in a frictional contact.

The output gear 19 is rotatably supported by a support shaft 20. The inner end of the support shaft 20 is rotatably supported by a boss portion 16c of the follower flange 16. As illustrated in FIG. 3, the output gear 19 is engaged with a sector gear h4 attached to the hinge pin h2.

Next, the speed reduction mechanism of the drive unit in accordance with the present embodiment will be explained. When the motion transmission motor 1 is driven, the input pulley 7 is rotated through the motion transmission belt 8 to rotate the input shaft 6. As the input shaft 6 rotates, the eccentric shaft 6a which is integrated with it also rotates.

Figure 7:
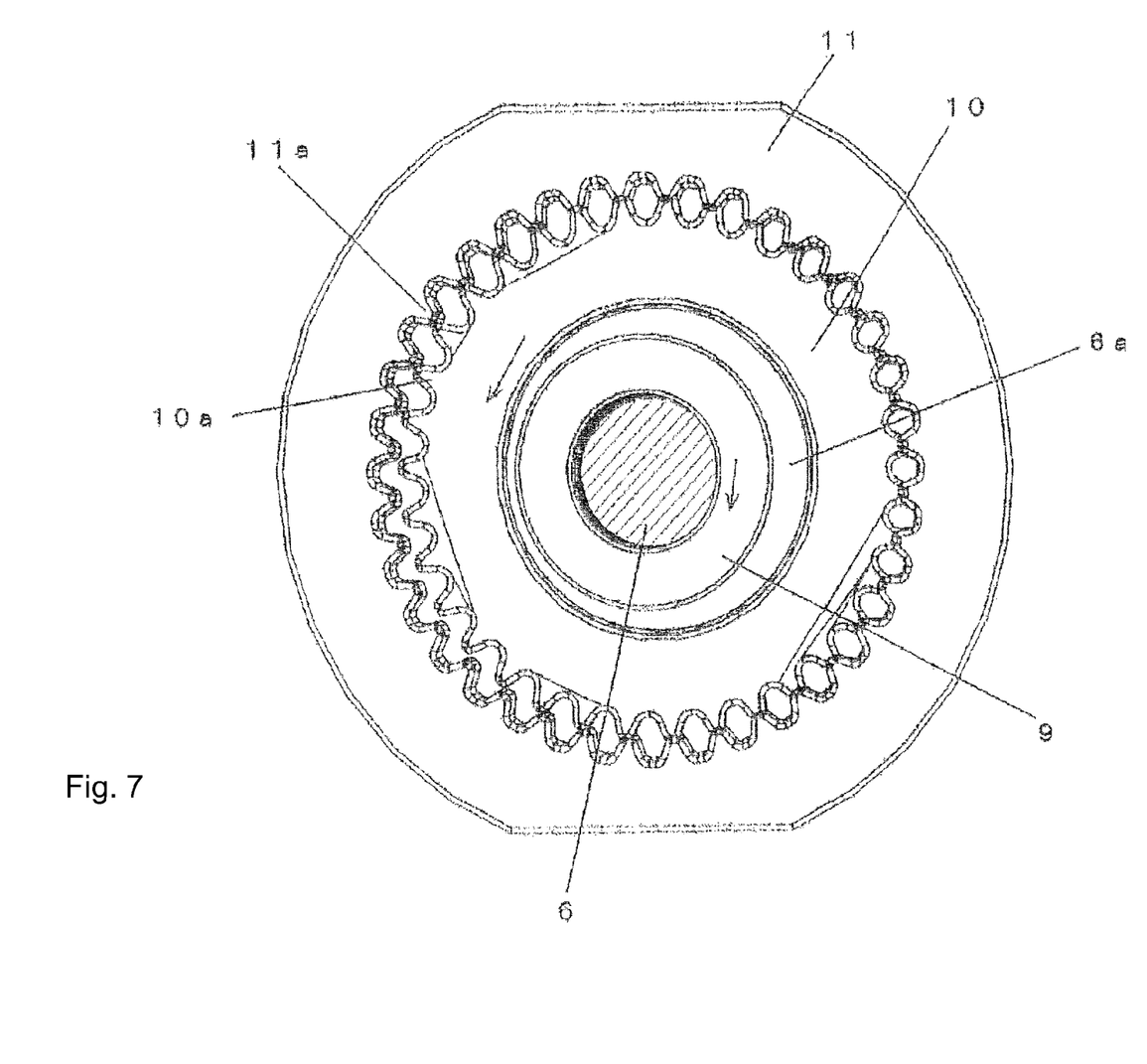
FIG. 7 is a view for explaining the action of a first planetary gear of the cover closer in accordance with the present invention.

As apparent from FIG. 7, since the first planetary gear 10 is rotatably fitted around outside of the eccentric shaft 6a through the bearing 9, and the external teeth 10a of the first planetary gear 10 are engaged with the internal tooth 11a of the fixed gear 11, the first planetary gear 10 thereby rotates in the fixed gear 11 at a low speed as the eccentric shaft 6a rotates.

If it is assumed that the rotation direction of the eccentric shaft 6a is the clockwise direction, the first planetary gear 10 rotates in the counter clockwise direction, and if the number of rotations of the eccentric shaft 6a is 1, the number of rotations of the first planetary gear 10 is the number calculated by dividing the differential number between the number of the internal tooth 11a and the number of the external teeth 10a by the number of the external teeth 10a.

For example, if the number of the external teeth 10a is 36 and the number of the internal tooth 11a is 35, the number of rotations of the first planetary gear 10 is 1/36, i.e., the first planetary gear 10 rotates by 10 degree. As a result, while the input shaft 6 rotates 36 revolutions, the first planetary gear 10 rotates one revolution.

As the first planetary gear 10 rotates, the follower flange 12 rotates in the same direction at the same rotational speed through the pins lob planted into the first planetary gear 10. Since the follower flange 12 is formed integrally with the eccentric shaft 12b, the eccentric shaft 12b rotates in the same manner.

Figure 8:
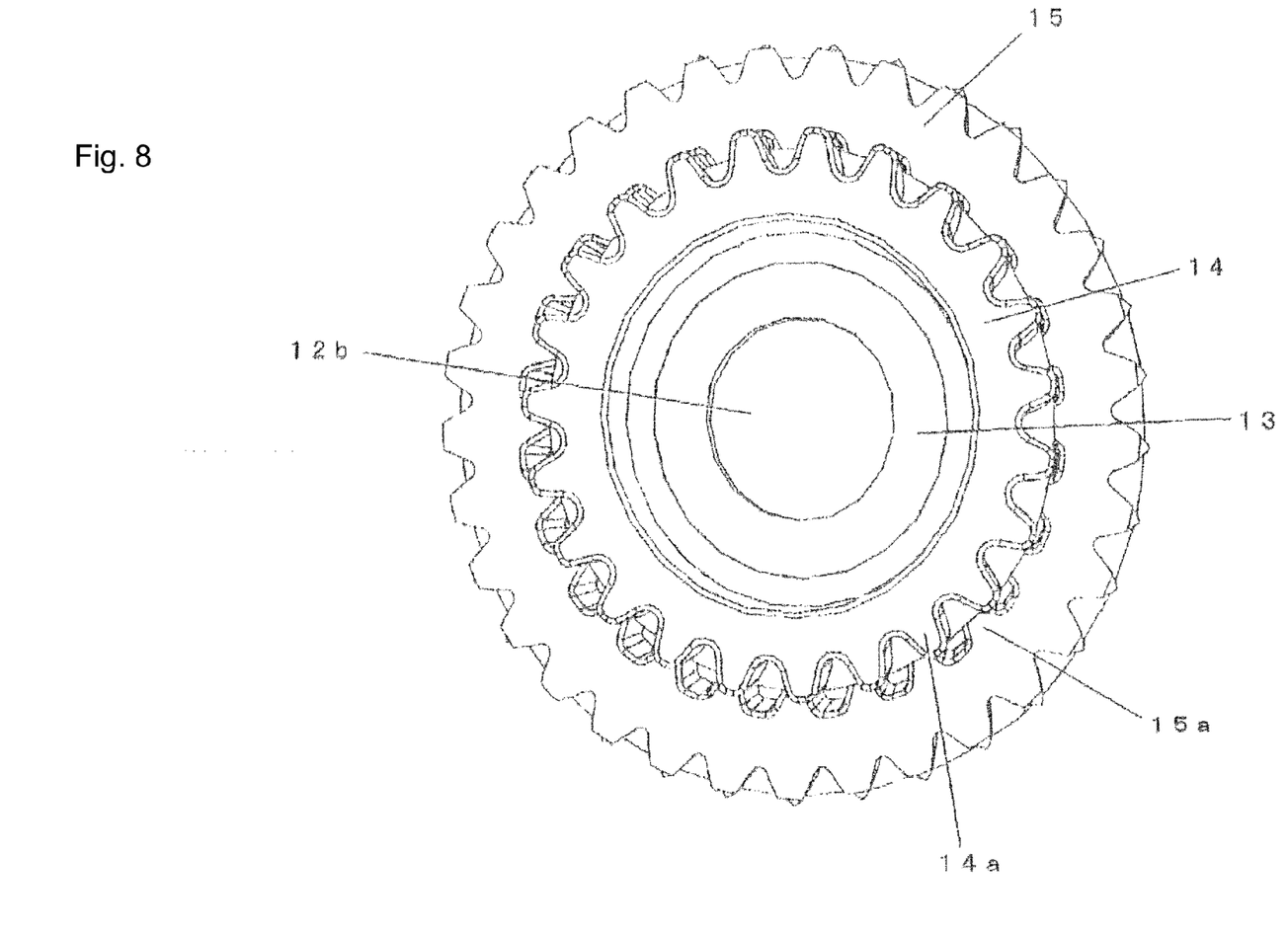
FIG. 8 is a view for explaining the action of a second planetary gear of the cover closer in accordance with the present invention.

As apparent from FIG. 8, since the second planetary gear 14 is rotatably attached to the eccentric shaft 12b through the needle bearing 13, and the external teeth 14a of the second planetary gear 14 are engaged with the internal tooth 15a of the sleeve gear 15, the second planetary gear 14 rotates inside the sleeve gear 15 at a low rotational speed as the eccentric shaft 12b rotates. The second planetary gear 14 rotates at a substantially reduced rotational speed in a direction opposite to the direction the eccentric shaft 12b rotates in the same manner as the first planetary gear 10 as described above.

When the second planetary gear 14 rotates, the follower flange 16 rotates in the same direction as the second planetary gear 14 at the same rotational speed through the pins 14b planted into the second planetary gear 14. The follower flange 16 is formed integrally with the external teeth 16b.

Since the external teeth 16b of the follower flange 16 are engaged with the internal tooth 17a of the rotating holder 17, the rotating holder 17 rotates as the follower flange 16 rotates. The rotating holder 17 is frictionally engaged with the slip ring 18 which is integrally formed with the output gear 19. As the rotating holder 17 rotates, the output gear 19 thereby rotates by a predetermined motion transmission friction torque. When an overload is applied to the output gear 19, the output gear 19 rotates idly.

Figure 9:
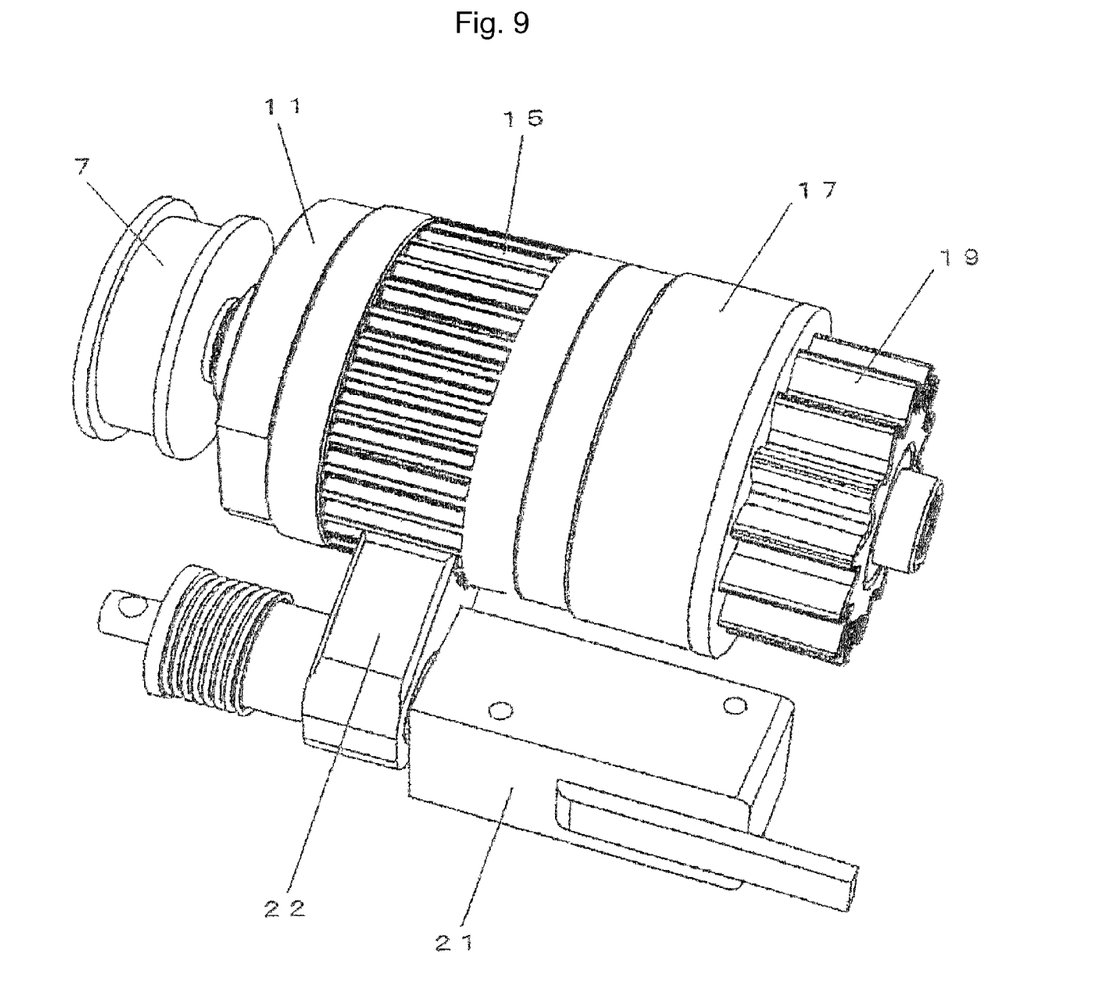
FIG. 9 is a perspective view of the main portion of the reduction gear mechanism shown in FIGS. 6A and 6B in accordance with the present invention.

Incidentally, as illustrated in FIG. 9, a clutch driving solenoid 21 is provided for engaging a locking tooth member 22 with the external teeth of the sleeve gear 15 to stop (lock) the rotation of the sleeve gear 15, or for releasing the engagement to enable the rotation of the sleeve gear 15.

When the sleeve gear 15 can freely rotate, the second planetary gear 14 rotates idly without rolling. In contrast to this, as has been discussed above, when the sleeve gear 15 is locked, the second planetary gear 14 normally operates to perform reduction of rotation.

Figure 10:
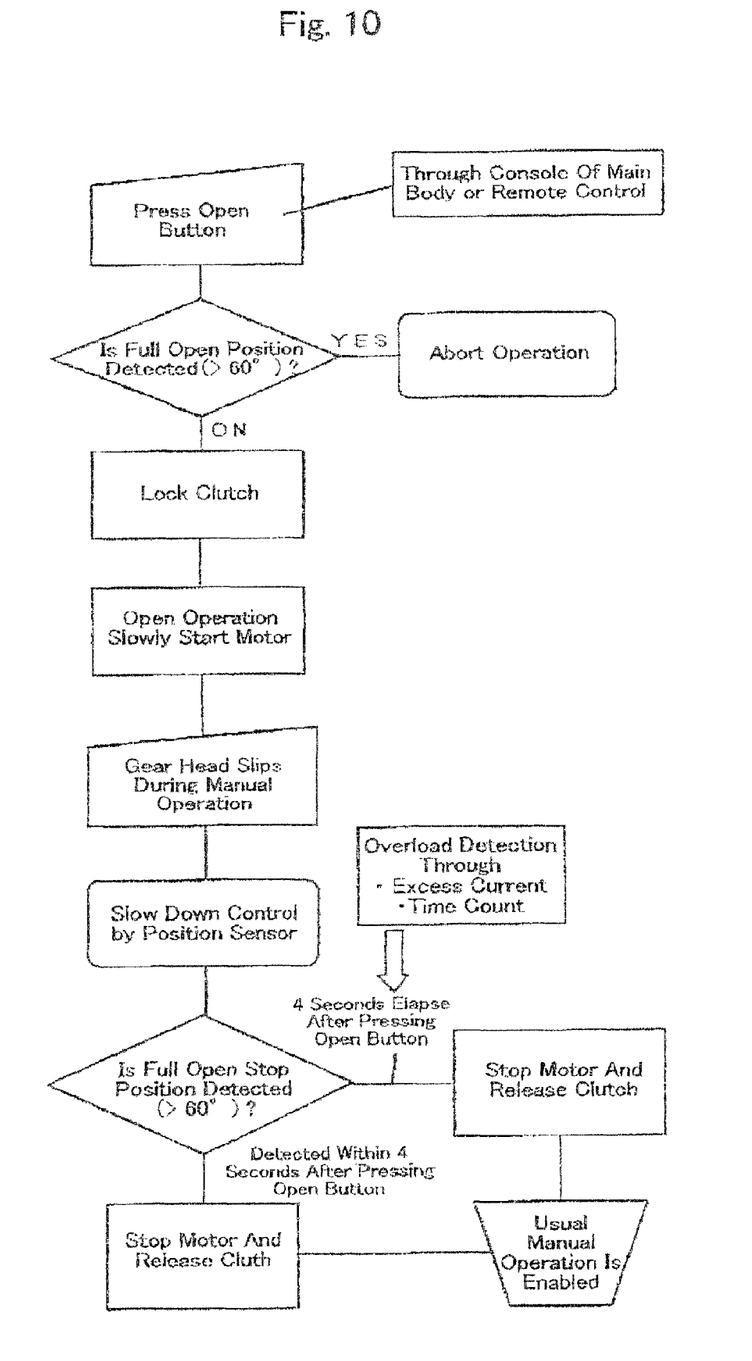
FIG. 10 is a flow chart for explaining the operation when opening the cover closer in accordance with the present invention.

FIG. 10 is a flow chart for explaining the operation when the pivotal member h3 is opened, i.e., when an operator opens the cover of a copying machine or the like which is connected to the pivotal member h3. First, when an open button of the drive unit is pressed, the open position of the pivotal member h3 is detected by a rotation position detecting mechanism.

If the pivotal member h3 is in an open position of 60 degrees or more (the "YES" branch), the drive unit does not operates. A remote control device may be provided in place of the open button by remote control.

If the pivotal member h3 is in an open position of no larger than 60 degrees (the "NO" branch), the clutch driving solenoid 21 is activated to lock the rotation of the sleeve gear 5 by the locking tooth member 22 as a clutch lock mechanism.

The electric motor 1 then rotates, and the pivotal member h3 opens by the drive unit D at a slow speed. In the case where an opening or closing action is taken against the rotation of the electric motor 1, the mechanism of the above planetary gears and the like runs idly by the action of the slip ring 18.

If the rotation position detecting mechanism detects a full opening position of the pivotal member h3 within 4 seconds after operating the open button, the electric motor 1 is slowed down for a certain period and stopped to stop the pivotal member h3 at a position a little displaced from the full opening position, followed by releasing the clutch lock.

On the other hand, if the rotation position detecting mechanism does not detect the full opening position even 4 seconds after operating the open button, the electric motor 1 is also stopped followed by releasing the clutch lock mechanism.

In addition to this, when an overload is applied during electrically opening the pivotal member h3 such that the opening operation is hindered, the overload is detected by a current meter, an elapse time counter and so forth, and the electric motor 1 is also stopped followed by releasing the clutch lock mechanism.

Thereafter, in each case, it becomes possible to manually open or close the pivotal member h3.

The electric motor 1 is controlled to reverse the rotation for a while before stopping the rotation because the clutch lock cannot be released when locked, so that the clutch lock is released after removing the load on the clutch.

Figure 11:
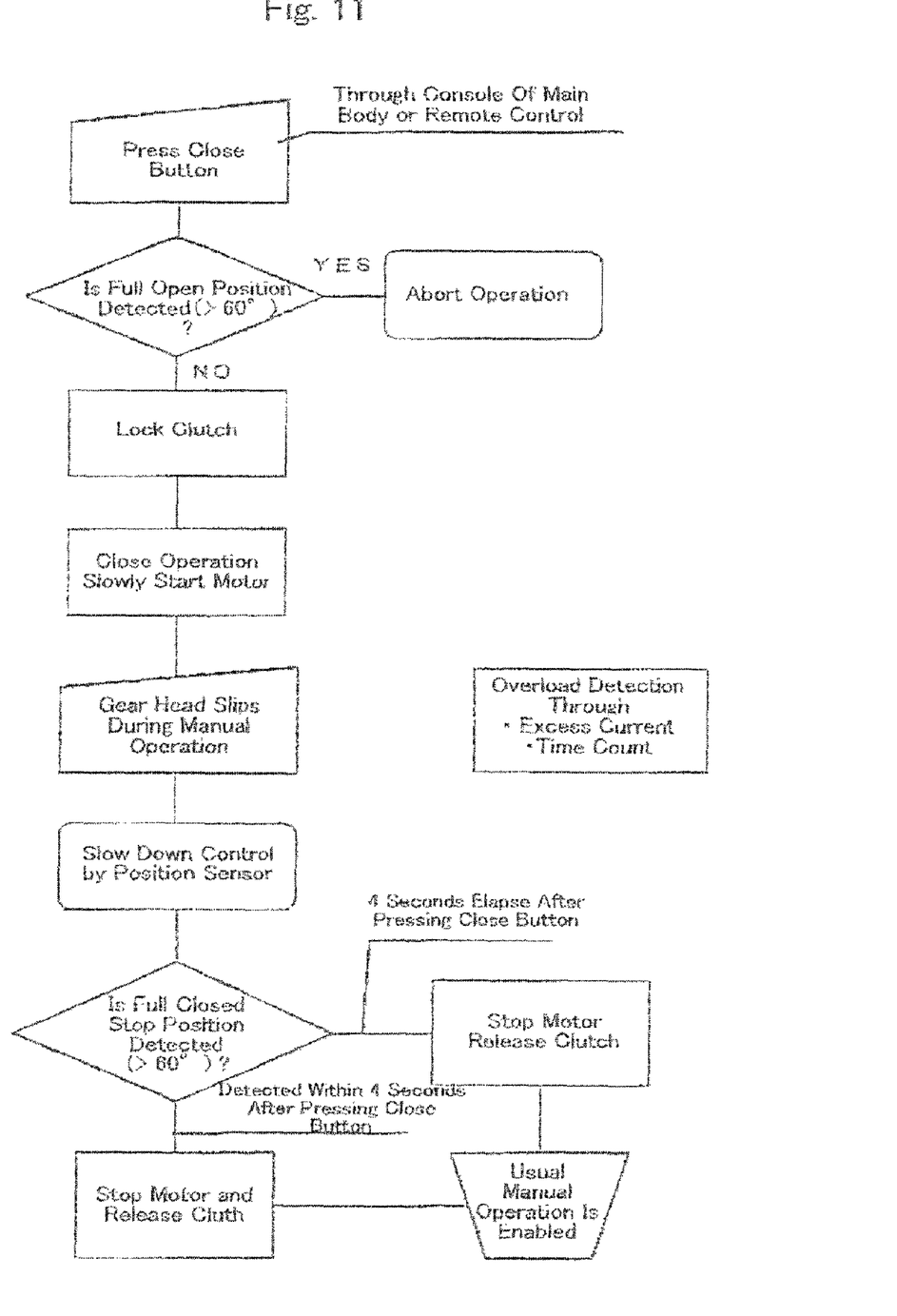
FIG. 11 is a flow chart for explaining the operation when closing the cover closer in accordance with the present invention.

FIG. 11 is a flow chart for explaining the operation when the pivotal member h3 is closed, i.e., when an operator closes the cover of a copying machine or the like which is connected to the pivotal member h3. First, when a close button of the drive unit is pressed, the open position of the pivotal member h3 is detected by the rotation position detecting mechanism.

If the pivotal member h3 is in an open position of 60 degrees or more (the "YES" branch), the pivotal member h3 does not operates. A remote control device may be provided in place of the close button by remote control.

If the pivotal member h3 is in an open position of no larger than 60 degrees (the "NO" branch), the clutch driving solenoid 21 is activated to lock the rotation of the sleeve gear 15 by the locking tooth member 22 as the clutch lock mechanism.

The electric motor 1 then rotates, and the pivotal member h3 is closed by the drive unit D at a slow speed. In the case where the pivotal member h3 is manually closed against the rotation of the electric motor 1, the mechanism of the above planetary gears and the like runs idly by the action of the slip ring 18.

If the rotation position detecting mechanism detects a full closing position state of the pivotal member h3 within 4 seconds after operating the close button, the electric motor 1 is slowed down for a certain period and stopped followed by releasing the clutch lock.

On the other hand, if the rotation position detecting mechanism does not detect the full closed position even 4 seconds after operating the close button, the electric motor 1 is also stopped followed by releasing the clutch lock mechanism.

In addition to this, when an overload is applied during electrically closing the pivotal member h3 such that the closing operation is hindered, this overload is detected by a current meter, an elapse time counter and so forth, and the electric motor 1 is also stopped followed by releasing the clutch lock mechanism.

Thereafter, in each case, it becomes possible to manually open or close the pivotal member h3.

The electric motor 1 is controlled to reverse the rotation for a while before stopping the rotation because the clutch lock cannot be released when locked, so that the clutch lock is released after removing the load on the clutch.

Figure 12:
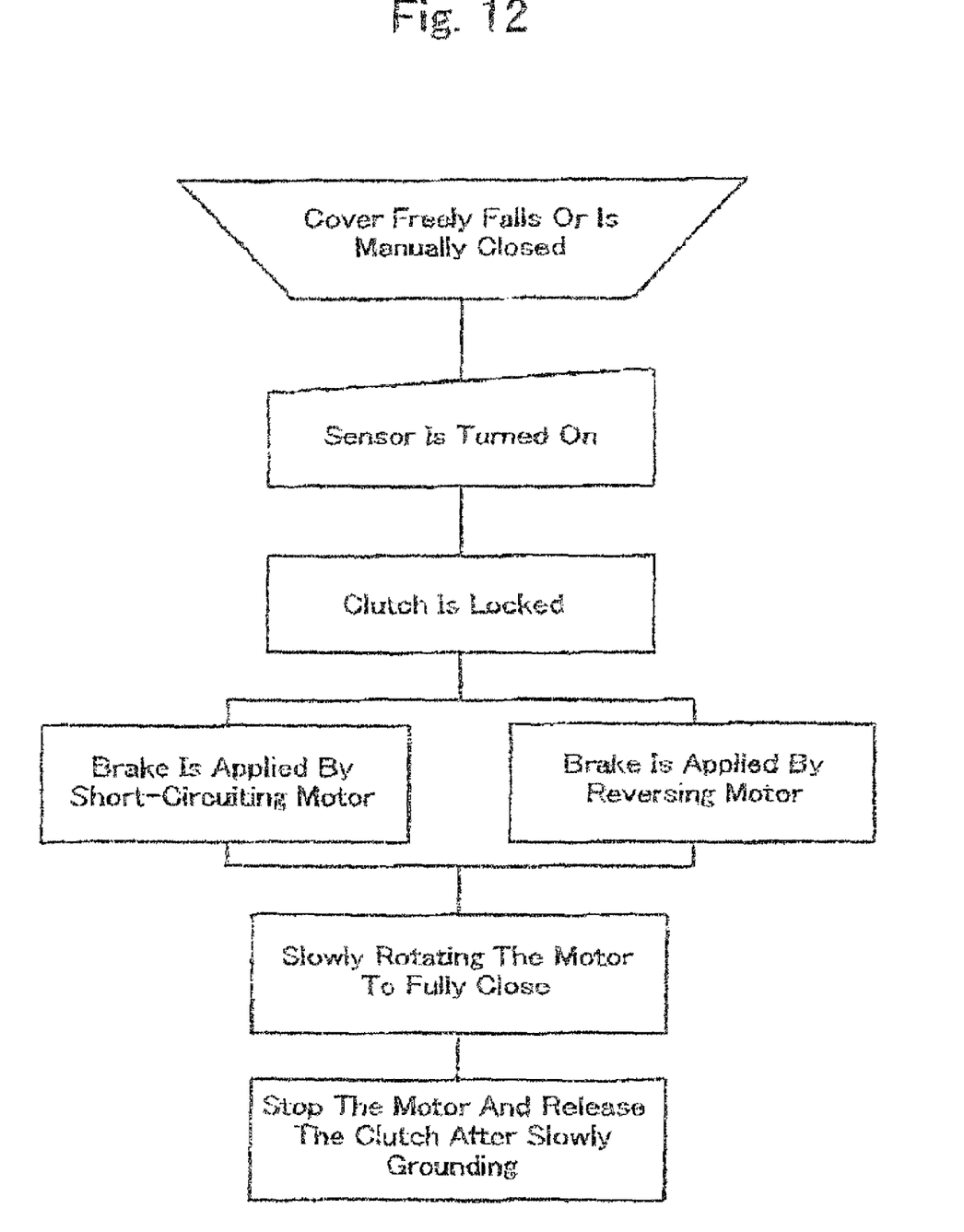
FIG. 12 is a flow chart for explaining an impact attenuation mechanism operating when the cover closer is closed and grounded, irrespective of electrically or manually.

FIG. 12 is a flow chart for explaining an impact attenuation mechanism operating when the pivotal member h3 is closed and grounded, irrespective of electrically or manually. If a sensor detects (is turned ON) the slightly open position of the pivotal member h3 just near the full closed position, the electric motor 1 is short-circuited or reversely rotated after locking the clutch to apply a brake, and then rotated at a slow speed such that the pivotal member h3 is slowly grounded. Thereafter, the electric motor 1 is stopped, and the clutch lock is released While the present invention has been described with reference to the particular illustrative embodiments, it is not to be restricted by the embodiments. It is to be appreciated that those skilled in the art can change or modify the embodiments without departing from the scope and spirit of the present invention.

For example, it is possible to provide a speed control mechanism which makes it possible to adjust the speed of opening and closing the cover at the user's desire.

The invention claimed is:
1. A cover closer comprising:
a stationary member;
a pivotal member which is pivotally connected to the stationary member; and
an electric drive unit composed of an electric motor and a reduction gear mechanism,
wherein the electric drive unit is integrated with the cover closer, wherein the reduction gear mechanism comprises an input gear driven by the electric motor, a reduction gear unit connected to the input gear, and an output gear connected between the reduction gear unit and the pivotal member, and wherein the reduction gear unit includes a sleeve gear having internal and external teeth, the internal teeth engaging with external teeth of an eccentric gear, and wherein the cover closer further comprises a positive clutch comprising a clutch tooth member mounted on the stationary member for movement into and out of engagement with only the external teeth of the sleeve gear, whereby when the clutch tooth member is engaged with the sleeve gear to stop rotation thereof, the eccentric gear rotates to provide speed reduction and a slip ring integral with the output gear to provide overload relief between the output gear and the reduction gear unit to prevent damage to the electric drive.

2. The cover closer as claimed in claim 1 wherein the electric drive unit is part of the cover closer.

3. The cover closer as claimed in claim 1 wherein the positive clutch enables the cover closer to be to be manually opened and closed.

4. The cover closer as claimed in claim 1 wherein the speed of moving the cover closer is controlled to reduce the load applied when starting motion of the cover and attenuate impact occurring when closing the cover closer for ensuring safety.

5. The cover closer as claimed in claim 4 wherein the electric motor is controlled by a control signal which is generated by operating an open/close button, a dedicated sensor, an external remote control unit or any combination thereof provided for a copying machine.

6. The cover closer as claimed in claim 1 wherein, when an overload is applied to the cover closer such that the motion of the cover closer is hindered while operating the electric motor, this overload is detected by a current meter, an elapse time counter.

7. The cover closer as claimed in claim 1 wherein the electric motor is provided with a speed control mechanism to adjust the speed of the operation of the cover closer at a user's desire.

8. The cover closer as claimed in claim 7 wherein the electric drive unit is capable of attenuating impact occurring when closing and grounding the cover closer.

9. A cover closer for electrically opening and closing a cover on a main body comprising:

a stationary member configured to be fixed to the main body;

a pivotal member which is pivotally connected to the stationary member and configured to be fixed to the cover; and an electric drive unit comprising an electric motor, and a reduction gear mechanism, connected between the stationary member and the pivotal member, and configured to rotate the pivotal member for opening or closing the cover, wherein the electric drive unit is integrated with the cover closer, wherein the reduction gear mechanism comprises an input gear driven by the electric motor, a reduction gear unit connected to the input gear, and an output gear connected between the reduction gear unit and the pivotal member, and wherein the reduction gear unit includes a sleeve gear having internal and external teeth, the internal teeth engaging with external teeth of an eccentric gear, and wherein the cover closer further comprises a positive clutch comprising a clutch tooth member mounted on the stationary member for movement into and out of engagement with only the external teeth of the sleeve gear, whereby when the clutch tooth member is engaged with the sleeve gear to stop rotation thereof, the eccentric gear rotates to provide speed reduction and a slip ring integral with the output gear to provide overload relief between the output gear and the reduction gear unit to prevent damage to the electric drive.

10. The cover closer as claimed in claim 9 wherein the main body is the main body of a copying machine.

* * * * *